Oct. 30, 1951     G. RAUGLAS     2,573,060
TRAILER AWNING

Filed June 19, 1948     3 Sheets-Sheet 1

INVENTOR.
Gerard Rauglas
BY
Thiess, Olson & Mecklenburger
Atty's

Oct. 30, 1951 G. RAUGLAS 2,573,060
TRAILER AWNING
Filed June 19, 1948 3 Sheets-Sheet 2

INVENTOR.
Gerard Rauglas
BY
Thiess, Olson, & Mecklenburger
Attys

Oct. 30, 1951            G. RAUGLAS            2,573,060
TRAILER AWNING

Filed June 19, 1948                                3 Sheets—Sheet 3

INVENTOR.
Gerard Rauglas.
BY
Thiess, Olson, & Mecklenburger,
Attys.

Patented Oct. 30, 1951

2,573,060

UNITED STATES PATENT OFFICE 2,573,060

TRAILER AWNING

Gerard Rauglas, Kankakee, Ill.

Application June 19, 1948, Serial No. 34,063

13 Claims. (Cl. 135—5)

This invention relates to awnings and more particularly to an awning for a house trailer and the like.

Various types of awnings have heretofore been proposed which are so weighty and bulky in design or so costly to produce as to make such a structure unattractive for such a purpose. The mobility and compactness of house trailers place certain requisites on the type of awnings to be used therewith. These requisites are as follows: (a) that the awning be of such design that it may be readily collapsed or extended when desired, by one or more persons, (b) that it be of simple lightweight construction, and (c) that it be collapsible into a small compact unit.

Thus it is one of the objects of the invention to provide an awning for house trailers and the like which possesses the requisites mentioned above.

It is a further object of the invention to provide an awning for house trailers and the like which will withstand repeated collapsing and extending without impairing the wearing qualities thereof.

It is a further object of this invention to provide an awning for house trailers and the like which will withstand high winds or rain without collapsing.

It is a further object of this invention to provide an awning in which the drainage of rain water therefrom may be controlled and thereby the formation of rain pockets prevented.

It is still a further object of this invention to provide an awning for house trailers and the like which is simple, yet sturdy in construction, effective in operation, and inexpensive to produce.

Further and additional objects will appear from the description, accompanying drawings, and appended claims.

In accordance with one embodiment of this invention an awning is provided comprising a fabric roof member having a hem-like pocket in the outer edge thereof and provided with a plurality of longitudinally spaced openings, a flexible stiffening rod extending through said pocket and having a plurality of loop-shaped elements projecting therefrom and cooperating with said openings, extensible supporting poles engaging said loop elements, and bracing means for said poles. The extensible supporting poles may be locked in an extended position upon relative twisting movement of the telescoping sections.

For a more complete understanding of this invention reference should be had to the drawings, wherein.

Figure 1:
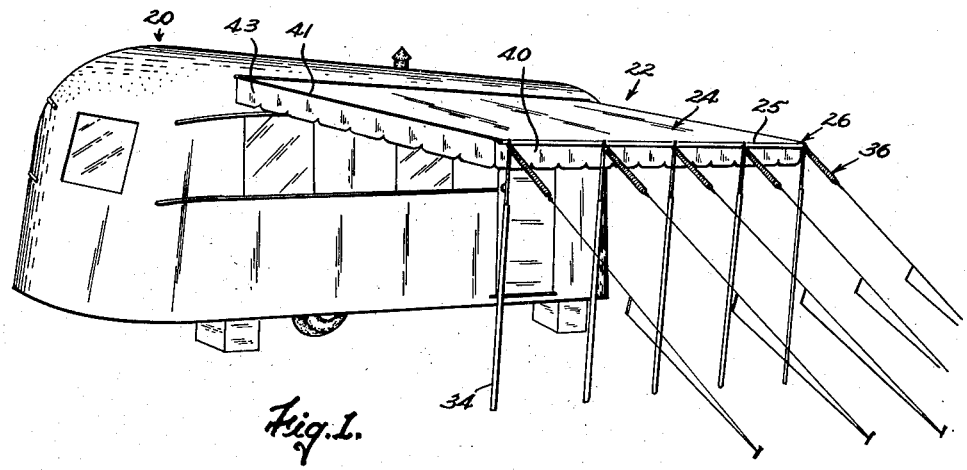
Figure 1 is a perspective view of house trailer with the awning attached thereto and in its extended or operative position.
Figure 2:
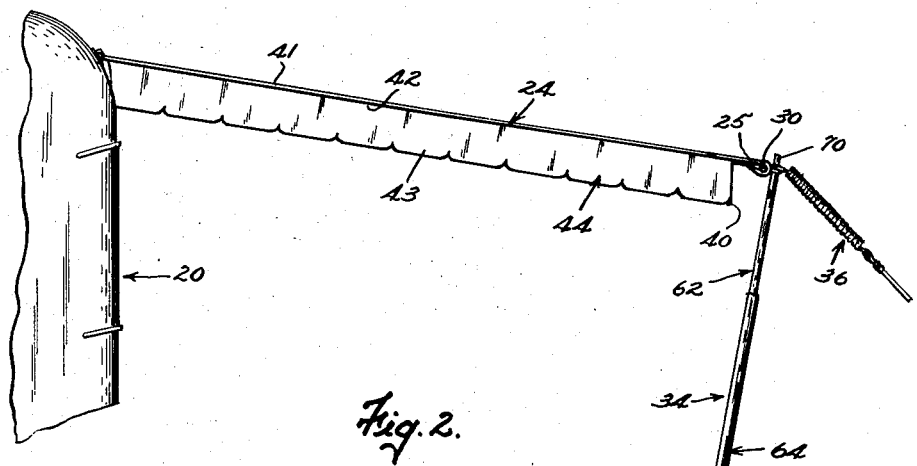
Fig. 2 is a fragmentary side elevational view of the house trailer and awning shown in Fig. 1.

Referring now to the drawings, and more particularly to Fig. 1, a house trailer 20 is shown in a temporarily fixed position and having an awning 22 attached thereto, and extending substantially the length of one side of said trailer. The awning 22 in this instance comprises a sloping roof member 24, preferably of a fabric material, having its outer edge 25 formed into a hem-like pocket 26, which is provided with a plurality of longitudinally spaced openings 28; a flexible stiffening rod 30 which extends through said pocket and has a plurality of loop-shaped elements 32 and 33 projecting therefrom and cooperating with said openings 28; extensible supporting poles 34 which engage said loop elements; and bracing means 36 which cooperate with said supporting poles.

Figure 3:
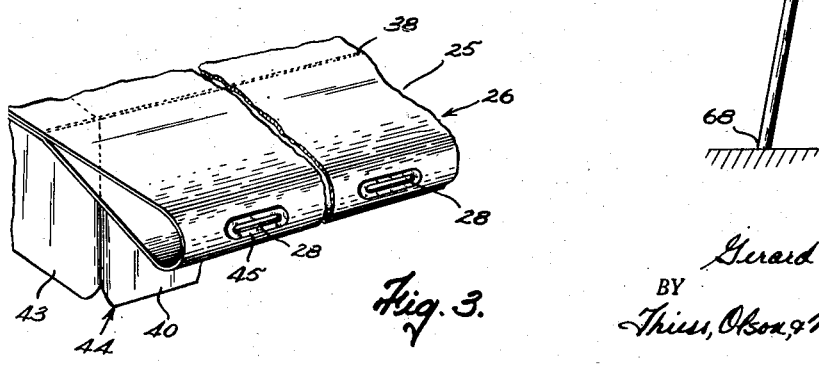
Fig. 3 is a fragmentary perspective view of the hem-like pocket formed at the outer edge of the awning.
Figures 5, 6:
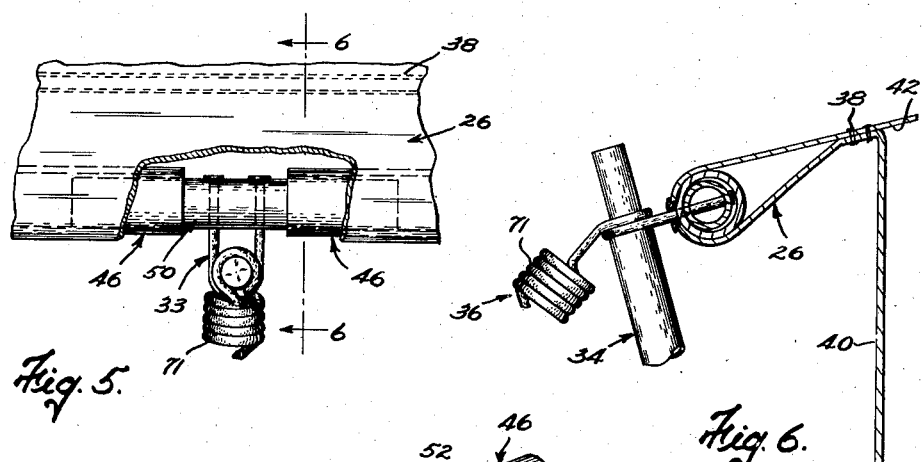
Fig. 5 is a fragmentary top plan view of the hem-like pocket in its extended position and with a portion of the pocket cut away to show the construction of the stiffening rod.
Fig. 6 is a fragmentary sectional view of the hem-like pocket in its operative position taken along line 6—6 of Fig. 5.

The construction of the hem-like pocket 26 is shown in Figs. 3 and 6 wherein the outer end portion 25 of the roof member 24 is folded back under said roof member and stitched thereto at 38, the remnant of said outer edge portion 25 freely extending downwardly to form a valance 40. The construction of the side edges 41 of the roof member are similar to that for the outer edge 25, above described, in that the edge portion is turned back and fastened to the under side 42 of said member 24 and the remnant thereof extending downwardly to form a valance 43. The adjacent edges of valances 40 and 43 are sewn together to form one continuous boxlike valance 44. The valance 40 is spaced rearwardly from the supporting poles 34 so that it will not be blown against said poles when there is a high wind and thus cause the poles to be urged rearwardly toward the trailer, causing the roof member 24 to slacken and enable the wind to get a better hold thereof. In such a situation the awning is frequently blown over the top of the trailer, resulting in damage to the awning and trailer. The construction of the hem-like pocket 26 and valance 40 shown in Fig. 6 eliminates this danger, because the pocket cuts the wind and the valance will be forced to lie flush against the under side 42 of the roof member. The pocket 26 is of sufficient size to enable the stiffening rod 30 to lie loosely therein, and has a plurality of longitudinally spaced, elongated openings 28 formed therein which are provided with grommets 45 to prevent tearing or excessive wear of the fabric at said openings.

Figure 4:
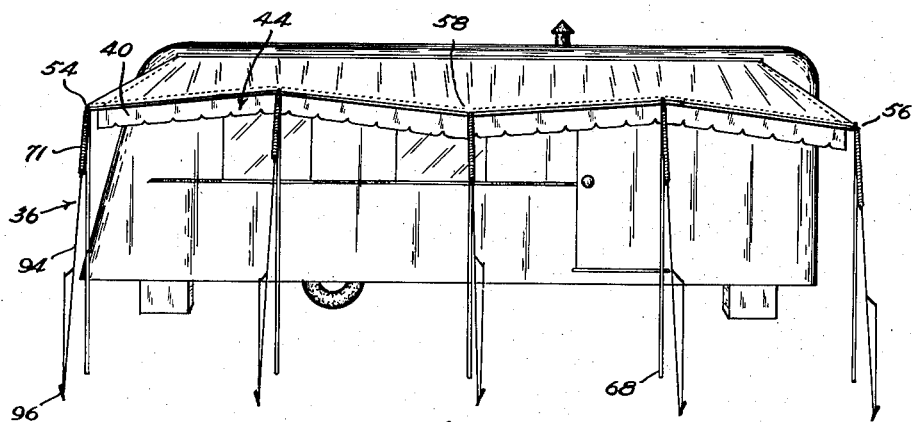
Fig. 4 is a front view of the house trailer and awning attached thereto with the outer edge of the roof member distorted so as to eliminate the formation of rain pockets and control the drainage of rain water therefrom.
Figure 7:
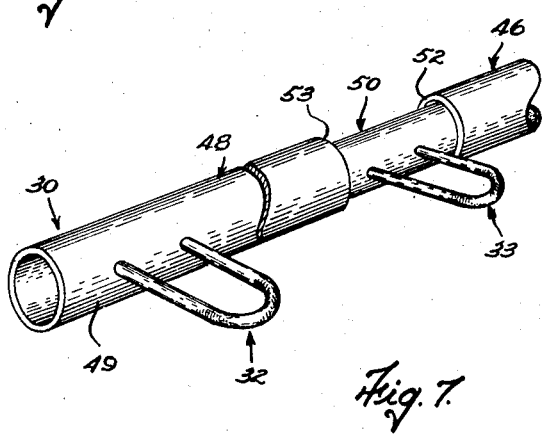
Fig. 7 is a fragmentary perspective view of the stiffening rod.

The stiffening rod 30 is flexible and comprises a plurality of pipe-like spacer sections 46, which are substantially the same length as the distance between the openings 28, a pair of pipe-like end sections 48 (only one shown in Fig. 7) having a loop-shaped element 32 rigidly fixed thereto and transversely projecting from the outer end portion 49 of said section 48, and a plurality of loose fitting connector sections 50 having loop elements 33 transversely projecting therefrom and swivelly mounted within the open end 52 of the adjacent spacer members and the open inner end 53 of the end section 48, as seen in Fig. 7, or adjacent spacer sections, as seen in Fig. 5. The end sections 48 prevent the flexible rod 30 from becoming disconnected when in its operative position. When the rod is placed within the pocket 26, the loop elements 32 and 33 cooperate with the corresponding openings 28 of the pocket. The flexibility of the stiffening rod 30 is determined by the amount which the connector sections 50 extend within the open ends 52 and 53 of the spacer and end sections 46 and 50 respectively, and the diameter of said connectors relative to the inside diameter of said spacer or end sections. The advantages of a flexible stiffening rod 30 are twofold: first, it allows the roof member 24 to be distorted to any one of a number of positions (only one being shown in Fig. 4), thus eliminating the formation of rain pockets and also controlling the drainage of the rain water therefrom; and, secondly, it enables the rod to be disassembled, when desired, into a small compact unit for storage. As shown in Fig. 4, the rain water would drain off the roof member 24 at the sides 54 and 56 and the center 58.

Figure 8:
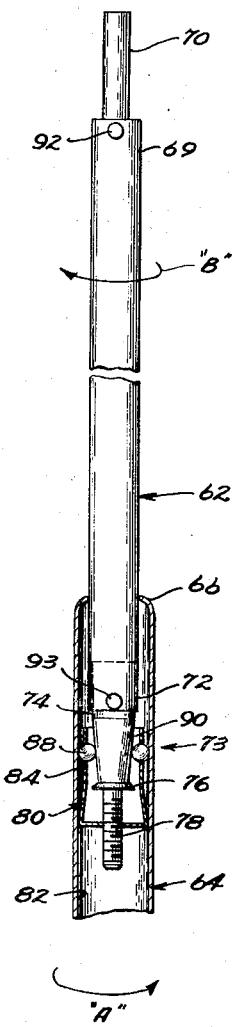
Fig. 8 is a fragmentary side elevational view of a supporting pole with the outer telescoping section cut away to expose the locking means for said extensible pole.
Figure 9:
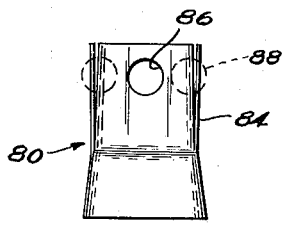
Fig. 9 is a side elevational view of the ferrule member of the locking means shown in Fig. 8 with the metallic balls held by said ferrule, shown in dotted lines.
Figure 10:
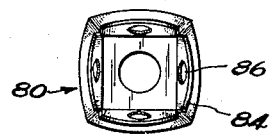
Fig. 10 is a top plan view of the ferrule shown in Fig. 9.

The supporting poles 34, as mentioned above, are extensible and each comprises a pair of telescoping members 62 and 64, as shown in Fig. 8. The outer telescoping member 64 is the longer of the two and has its upper end 66 turned in slightly so as to more closely embrace section 62. The lower end 68 of the outer telescoping section 64 rests on the ground. The upper, or smaller, telescoping section 62 has at its upper end 69 a longitudinally extending stud 70 which is engaged by the loop elements 32 and 33. The loop elements are held against the end 69 of the section 62 when in their operative position by the coil bracing spring 71, to be discussed more fully later. The inner end 72 of the smaller telescoping section 62 extends within section 64 and is provided with a locking mechanism 73 for holding the telescoping sections 62 and 64 in an extended position. The mechanism 73 is actuated upon relative twisting movement of the section.

The locking mechanism 73 comprises a tapered guide member 74 rigidly fixed to the end 72 of the section 62 and longitudinally extending therefrom and having an annular shoulder 76 at the bottom of the taper and a threaded stud 78 longitudinally extending from said shoulder, a ferrule 80 threaded on said stud 78 and frictionally engaging the inside periphery 82 of the outer section 64, the sides 84 of said ferrule being provided with a plurality of spaced openings 86, and a plurality of metallic balls 88 seated in said openings. As seen in Fig. 8, the balls 88 contact the tapered sides 90 of the guide member 74 and upon a counterclockwise movement "A" of section 64 and a clockwise movement "B" of section 62 the ferrule member 80 is threaded onto stud 78 because of the slight frictional engagement of the ferrule with the inside periphery 82 of the section 64. Upon the threading of the ferrule on stud 78, the balls 88 are forced outwardly due to the tapered sides 90 of the guide member 74 and engage the inside periphery 82 of section 64, thus locking the telescoping section in any desired extended position. To unlock the sections they are twisted in the opposite direction from that shown, thus causing the ferrule to unthread and the balls to release their grip. The annular shoulder 76, aforementioned, at the bottom of the taper, prevents the balls from dropping out of the openings 86 in the sides 84 of the ferrule. Stops 92 and 93 limit the amount of telescoping of the sections.

The bracing means 36 for the supporting poles comprise a coil spring 71 which engages the stud 70 of telescoping section 62, as seen in Fig. 6, an adjustable guide rope 94 attached to said coil, and a stake 96 for anchoring said rope to the ground. The coil 71 seats the loop elements 32 and 33 about stud 70 and exerts a positive pulling force on the roof member 24 at all times.

Thus it will be seen that an awning has been provided for house trailers and the like which will readily withstand repeated collapsing and extending and high winds as well, without impairing the wearing qualities thereof. Furthermore, it is simple, yet sturdy and lightweight in construction, effective in operation, inexpensive to produce, and adapted to be collapsed into a small compact unit.

While a particular embodiment of this invention is shown, it will be understood, of course, that the invention is not to be limited thereto, since many modifications may be made, and it is contemplated, therefore, by the appended claims to cover any such modifications as fall within the true spirit and scope of this invention.

I claim:

1. An awning comprising a sloping, pliable, roof member having a hem-like pocket provided with a plurality of openings therein, a stiffening rod extending through said pocket and having a plurality of loop-shaped elements projecting therefrom and cooperating with said openings, a plurality of supporting poles engageable with said loop-shaped elements, and bracing means for said poles.

2. An awning comprising a sloping, pliable, roof member having a hem-like pocket provided with a plurality of longitudinally spaced openings therein, a stiffening rod extending through said pocket and having a plurality of loop-shaped elements projecting therefrom and cooperating with said openings, a plurality of supporting poles engageable with said loop-shaped elements, and bracing means for said poles.

3. An awning comprising a sloping, pliable, roof member having the outer edge portion thereof turned back and secured to the under side of said roof member to form a hem-like pocket provided with a plurality of openings formed therein and the remnant of said edge portion extending downwardly from said roof member and disposed rearwardly of said pocket to form a valance, a stiffening rod extending through said pocket and being substantially the length thereof, said rod having a plurality of elements projecting therefrom and cooperating with said openings, supporting poles engageable with said elements, and bracing means for said poles.

4. An awning comprising a sloping, pliable, roof member having the side edges thereof turned back and secured to the underside of said roof member and the remnant of said side edges extending downwardly from said roof member and spaced inwardly from the sides to form a valance, and the outer edge of said roof member turned back and secured to the underside thereof to form a hem-like pocket provided with a plurality of openings formed therein and the remnant of said outer edge portion extending downwardly from said roof member and spaced rearwardly from said pocket to form a valance, the adjacent edges of said valances being joined together, a stiffening rod extending through said pocket and having a plurality of elements extending transversely therefrom and cooperating with said openings, supporting poles engageable with said elements, and bracing means for said poles.

5. An awning comprising a sloping fabric roof member having a hem-like pocket provided with a plurality of longitudinally spaced openings, a stiffening rod extending through said pocket and having a plurality of U-shaped elements projecting therefrom and cooperating with said openings, a plurality of extensible supporting poles engageable with said U-shaped elements and bracing means for said poles.

6. The awning claimed in claim 2 in which the stiffening rod is flexible and comprises a plurality of spacer sections having open ends and a plurality of loose fitting connector sections swively mounted within the open ends of said adjacent spacer sections, said connector sections having a loop-shaped element projecting therefrom and extending through the adjacent pocket openings.

7. The awning claimed in claim 2 in which the stiffening rod is flexible and comprises a plurality of spacer sections having open ends, a pair of end sections having open ends and a loop element projecting therefrom at one end, and a plurality of loose fitting connector sections having loop-shaped elements projecting therefrom, said connector sections swively mounted within the open ends of said adjacent spacer sections and adjacent end and spacer sections, said loop elements extending through the adjacent pocket openings.

8. The awning claimed in claim 2 in which the stiffening rod is flexible and comprises a plurality of spacer sections having open ends and a plurality of loose fitting connector sections rotatably mounted within said open ends of said adjacent spacer sections, said spacer sections being substantially the same length as the spacing of said pocket openings.

9. An awning comprising a sloping, pliable, roof member having a hem-like pocket provided with a plurality of openings formed therein, a stiffening rod extending through said pocket and having a plurality of elements projecting transversely therefrom and cooperating with said openings, and a plurality of supporting poles engageable with said elements.

10. An awning comprising a sloping, pliable, roof member having a hem-like pocket formed in the outer edge thereof and provided with a plurality of spaced openings, a flexible stiffening rod extending through said pocket and having a plurality of elements projecting transversely therefrom and insertable through said openings, and a plurality of supporting poles engageable with said projecting elements.

11. An awning comprising a sloping, pliable, roof member having the outer edge thereof turned back and secured to the underside of said roof member to form a hem-like pocket having a plurality of openings provided therein and the remnant of said edge portion extending downwardly from said roof member to form a valance, a stiffening rod extending through said pocket and having a plurality of loop-shaped elements projecting therefrom and cooperating with said openings, and a plurality of supporting poles engageable with said loop-shaped elements.

12. An awning comprising a sloping, pliable, roof member having the outer edge thereof turned back and secured to the underside of said roof member to form a hem-like pocket having a plurality of longitudinally spaced openings provided therein and the remnant of said edge portion extending downwardly from said roof member and spaced rearwardly from said pocket to form a valance, a stiffening rod extending through said pocket and having a plurality of loop-shaped elements projecting therefrom and cooperating with said openings, and a plurality of supporting poles engageable with said loop-shaped elements.

13. An awning comprising a sloping, pliable, roof member having the outer edge portion thereof turned back and secured to the underside of said roof member to form hem-like pocket having a plurality of openings formed therein, the remanant of said edge portion extending downwardly from said roof member to form a valance, a stiffening rod extending through said pocket and having a plurality of elements projecting transversely therefrom and cooperating with said openings, and a plurality of supporting poles engageable with said elements.

GERARD RAUGLAS.

REFERENCES CITED

The following references are of record in the file of this patent:

UNITED STATES PATENTS

| Number | Name | Date |
|---|---|---|
| 1,412,302 | Wittmann | Apr. 11, 1922 |
| 1,763,455 | De Bruijn | June 10, 1930 |
| 2,000,644 | Powers | May 7, 1935 |
| 2,423,402 | Olsen | July 1, 1947 |
| 2,459,026 | Hardy | Jan. 11, 1949 |

FOREIGN PATENTS

| Number | Country | Date |
|---|---|---|
| 433,590 | Great Britain | Aug. 16, 1935 |
| 583,586 | France | Nov. 3, 1924 |